Nov. 24, 1936.    J. HARRINGTON    2,062,025
METHOD AND APPARATUS FOR TREATING MOISTURE CONTAINING SUBSTANCES
Filed Dec. 19, 1931    9 Sheets-Sheet 3
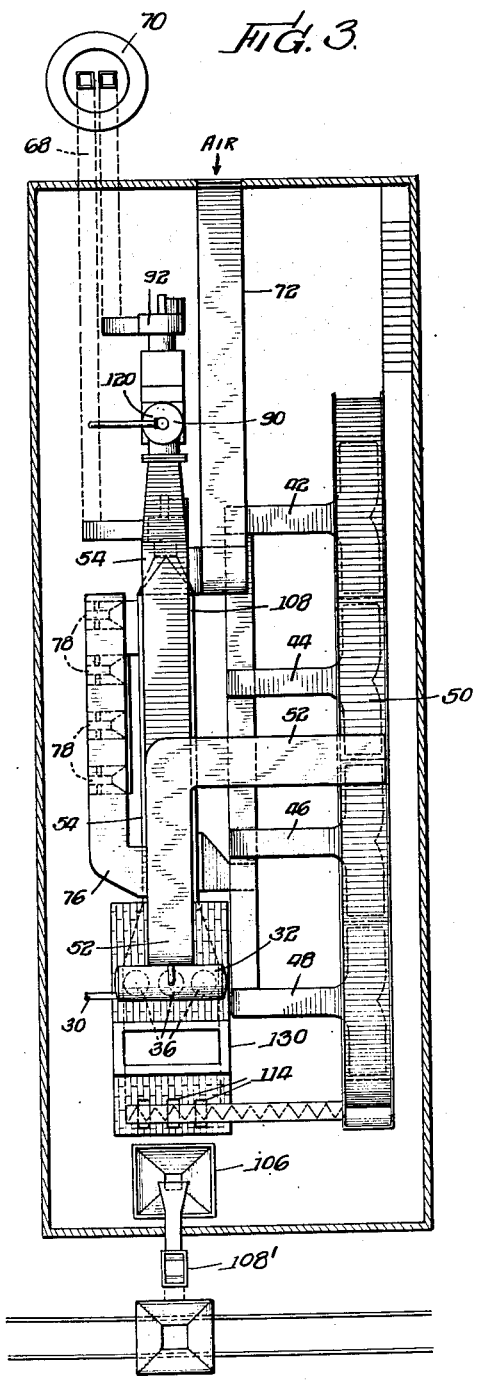
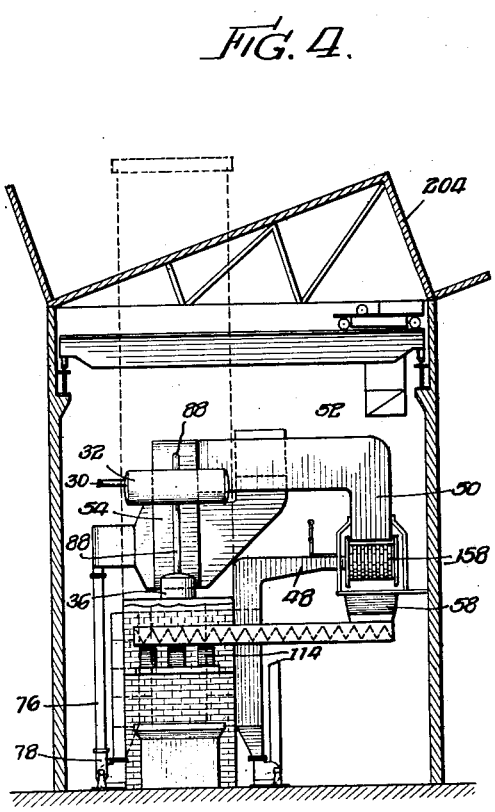
Inventor:-
Joseph Harrington,
By Cheever, Cox & Moore
Attys.

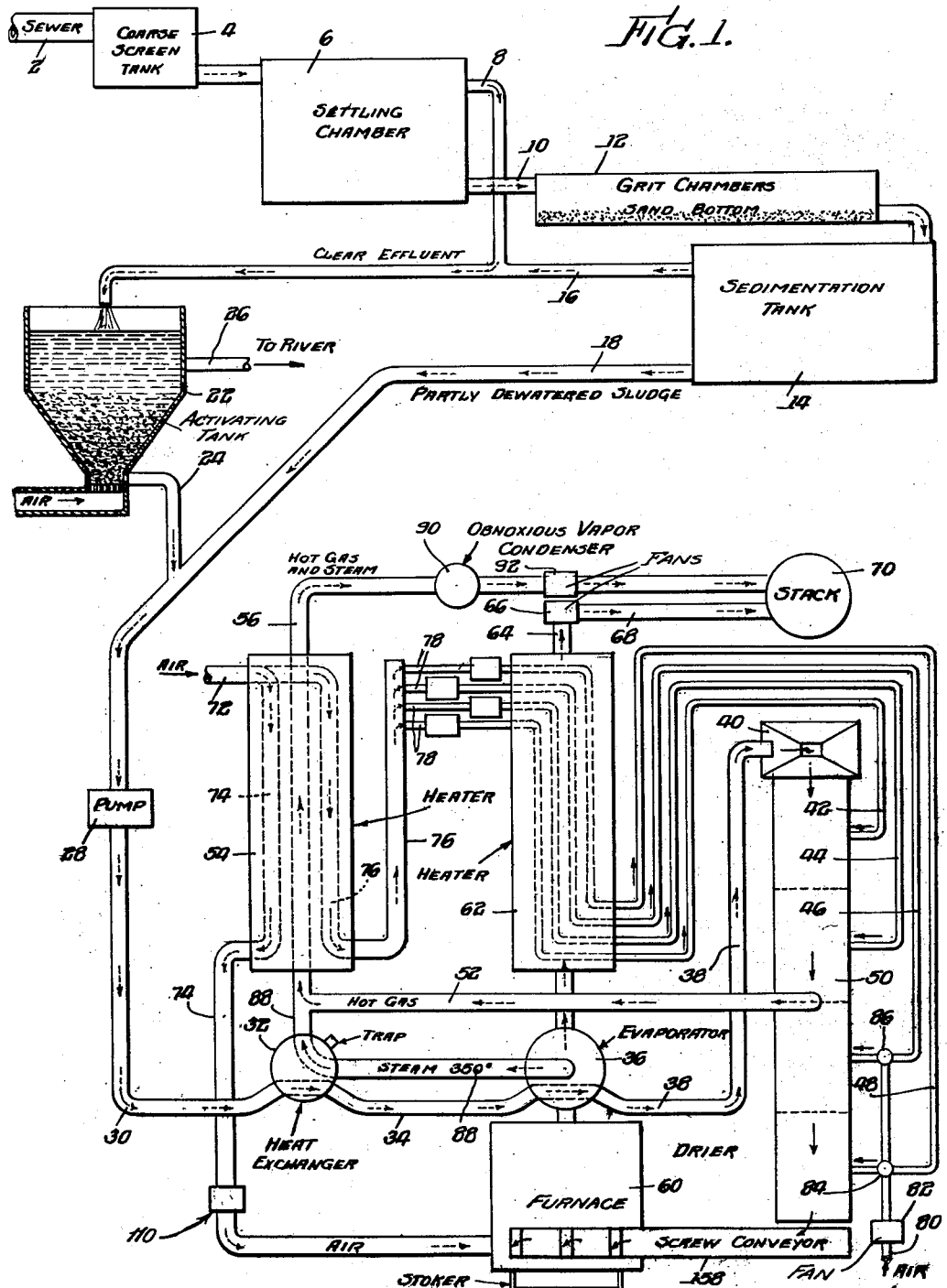
Nov. 24, 1936.   J. HARRINGTON   2,062,025
METHOD AND APPARATUS FOR TREATING MOISTURE CONTAINING SUBSTANCES
Filed Dec. 19, 1931   9 Sheets-Sheet 1

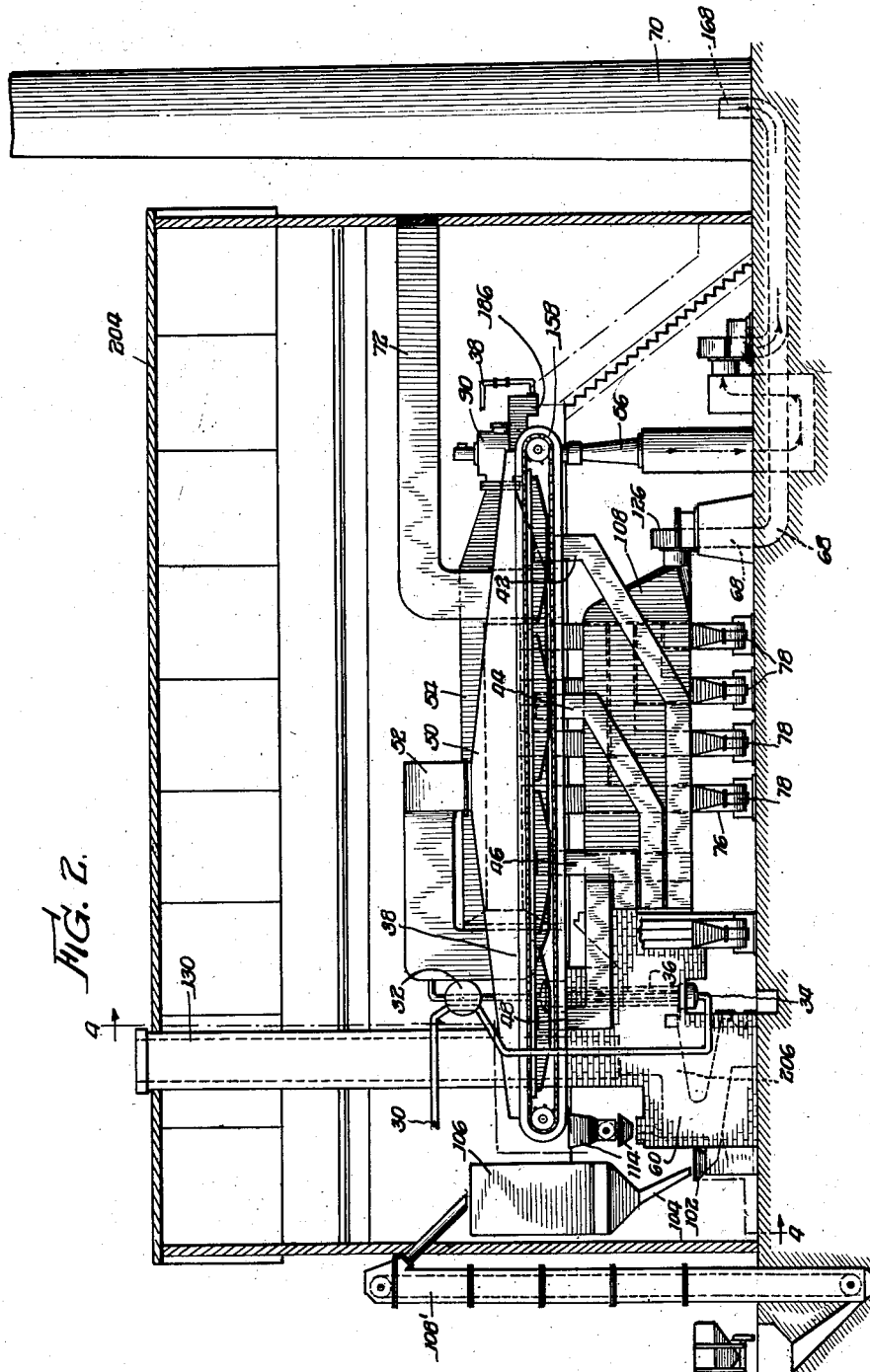

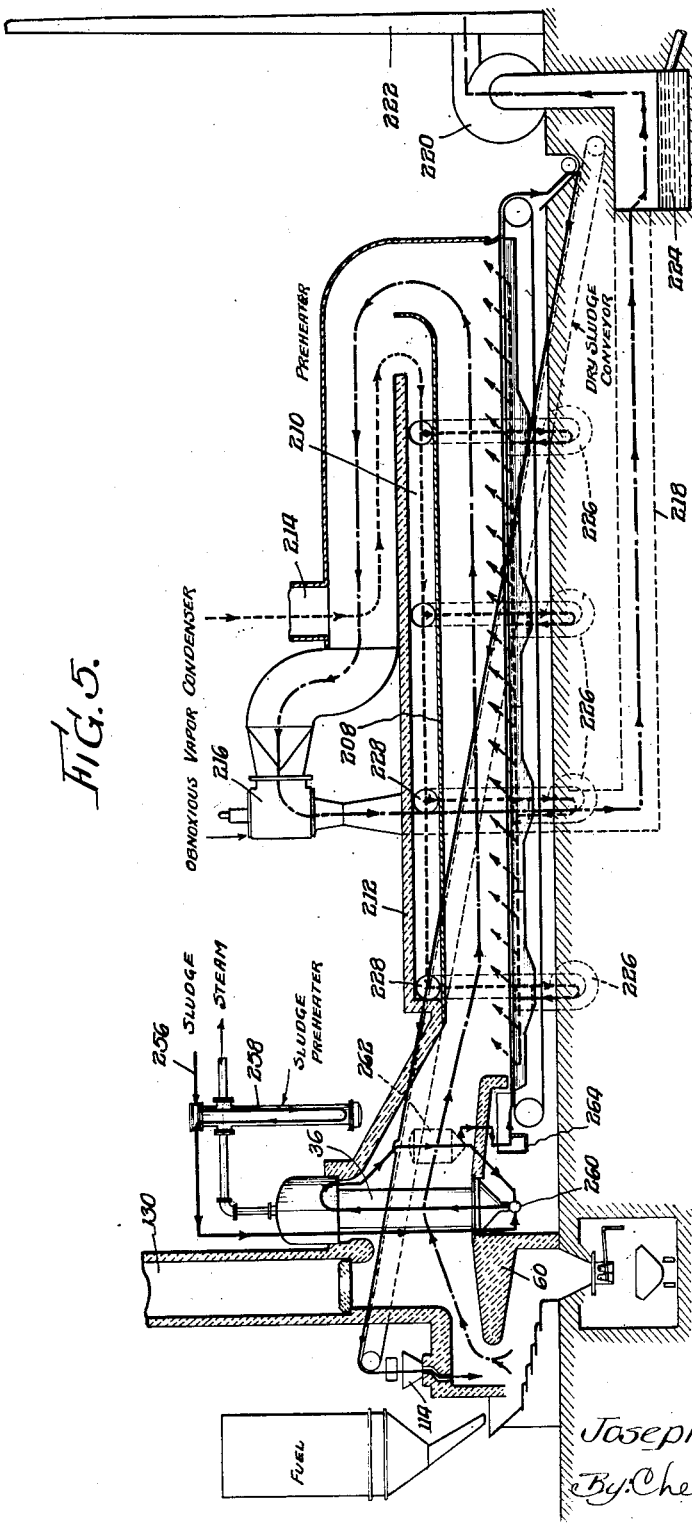

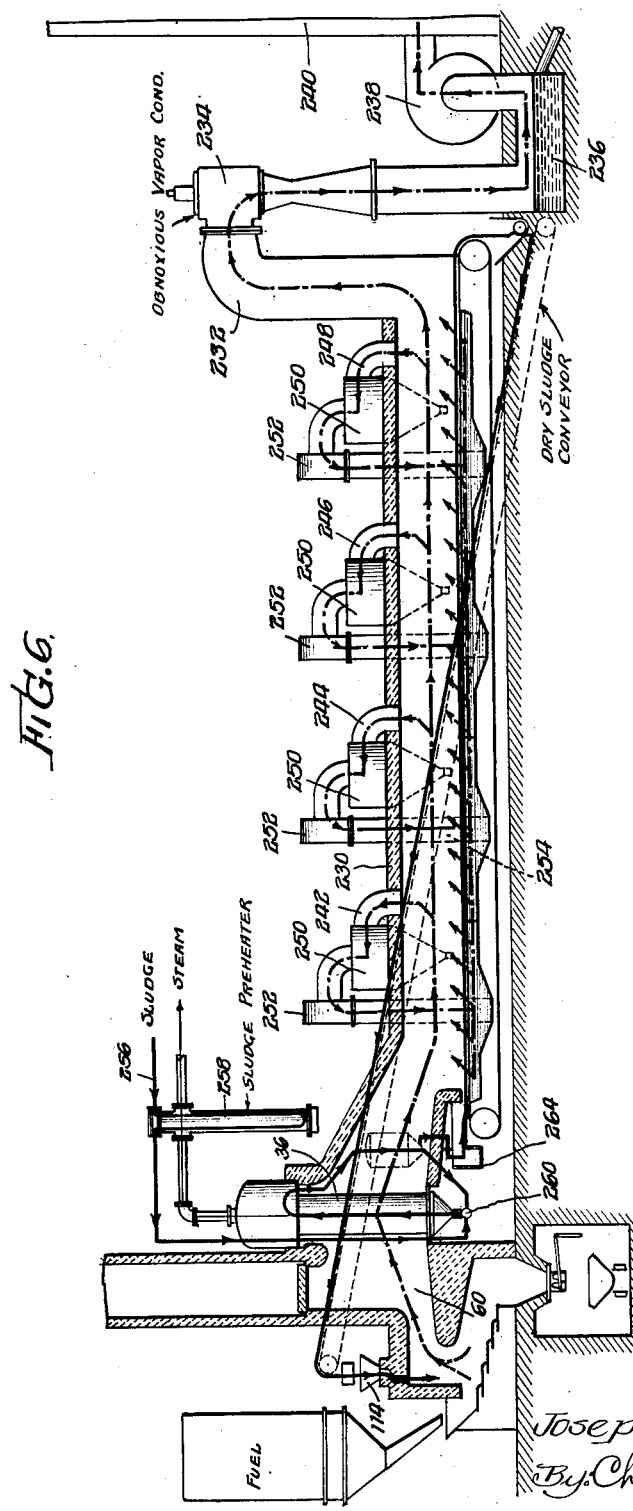

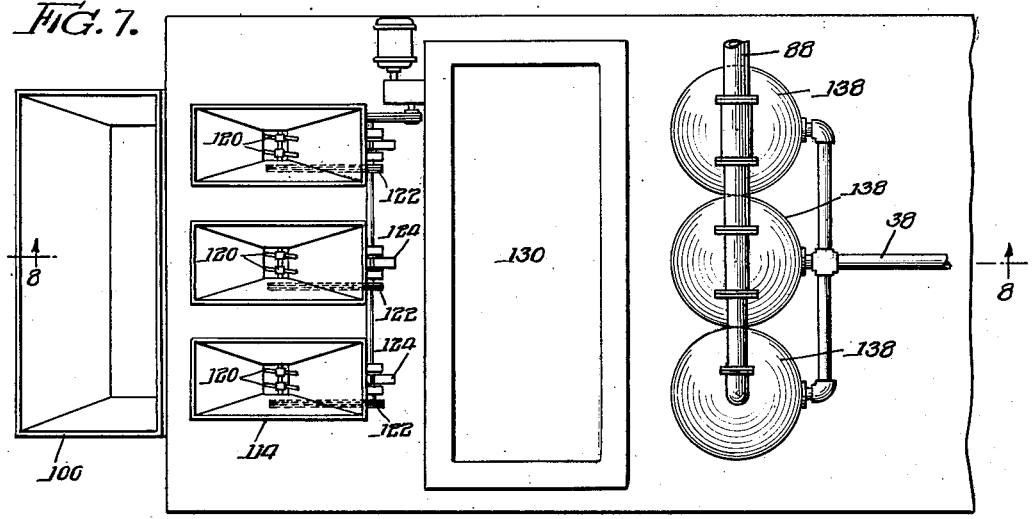
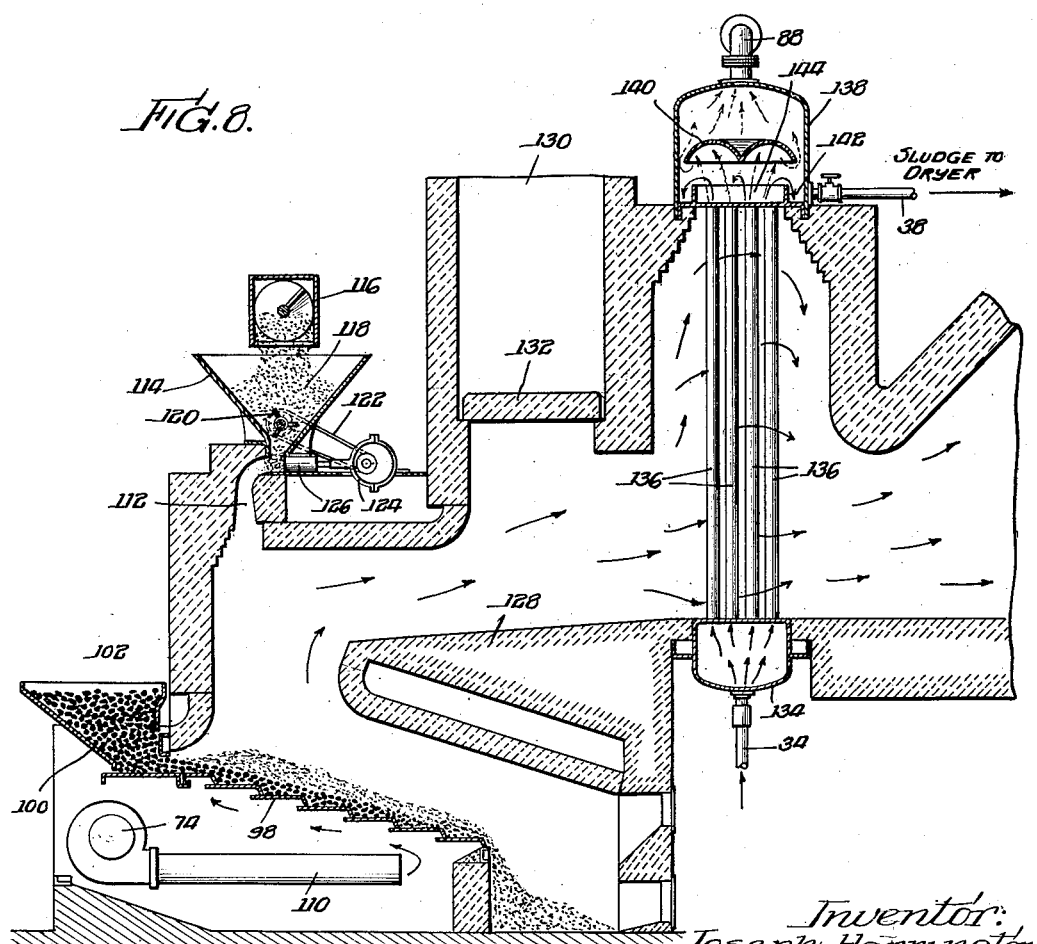

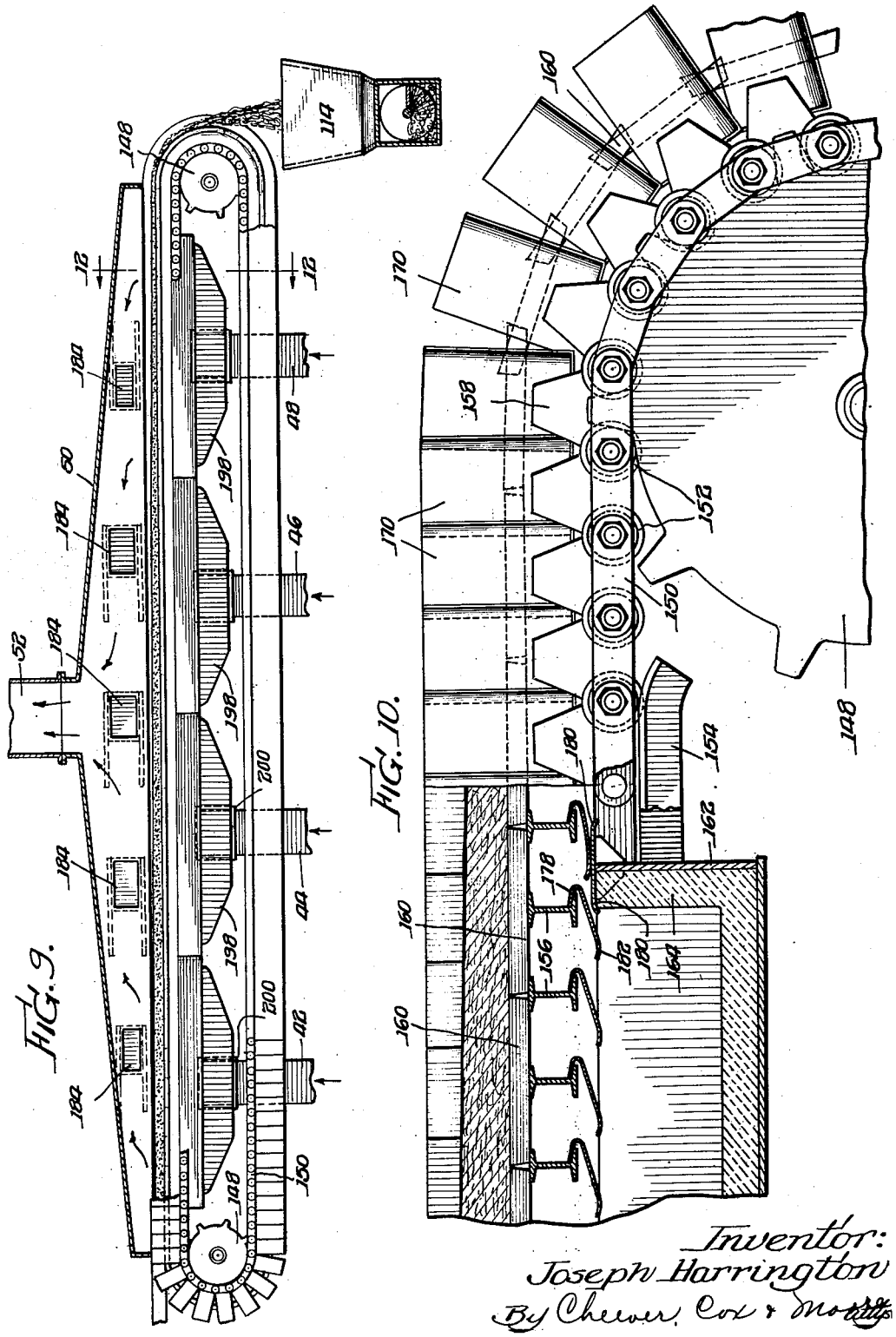

Nov. 24, 1936. J. HARRINGTON 2,062,025
METHOD AND APPARATUS FOR TREATING MOISTURE CONTAINING SUBSTANCES
Filed Dec. 19, 1931 9 Sheets-Sheet 8

Inventor:-
Joseph Harrington,
By: Cheever Cox & Moore attys

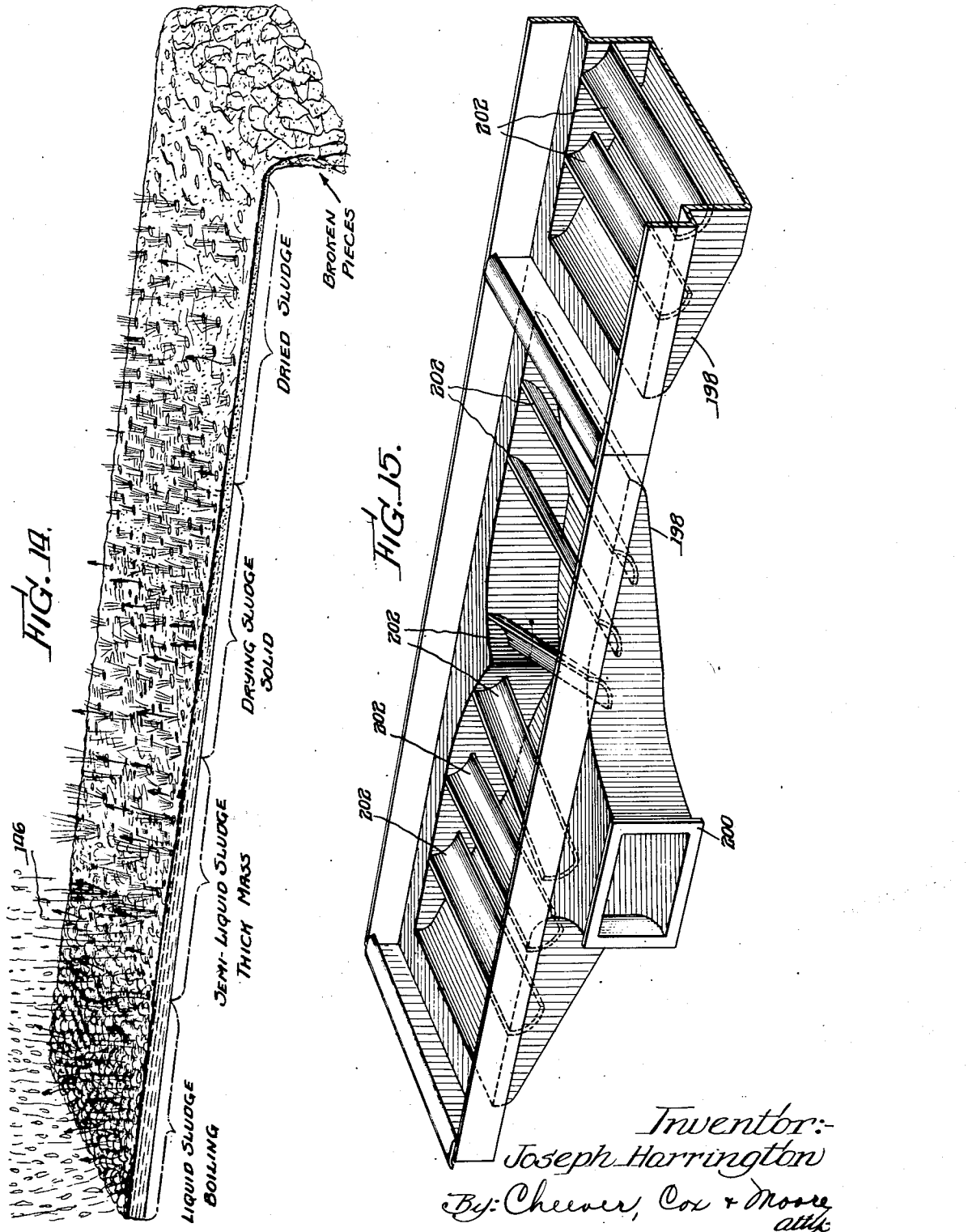

Patented Nov. 24, 1936

2,062,025

UNITED STATES PATENT OFFICE 2,062,025

METHOD AND APPARATUS FOR TREATING MOISTURE-CONTAINING SUBSTANCES

Joseph Harrington, Riverside, Ill.

Application December 19, 1931, Serial No. 582,098

8 Claims. (Cl. 110—15)

This invention relates to a process and apparatus for the sanitary and commercial disposal of sewage by heating the same to combustible dryness and burning the dried residue.

In certain aspects, my invention includes improvements in the process and apparatus for the treatment of sewage disclosed and claimed in an application filed by me, Serial No. 558,536, and herein include the preliminary partial dewatering of raw or liquid sewage before the main drying operation.

One of the objects of my invention is to provide a process and apparatus for the economical and sanitary disposal of sewage, including raw sewage.

Another object of my invention resides in the provision of a process and apparatus for the economical and sanitary disposal of fluid sewage sludge by burning a mixture of sewage sludge and fuel, preferably coal or coke, whereby to consume the sludge and/or create sufficient heat of combustion which can be utilized in drying additional quantities of sewage.

Yet another object of my invention resides in the provision of an improved process and apparatus for the disposal of sewage comprising the addition of combustibly dry sewage sludge to burning fuel in a manner to prevent the fluxing of the two combustible ingredients, and whereby to provide sufficient heat of combustion to dry additional quantities of sewage to combustibly dry state.

Yet another object of my invention resides in the provision of a method and apparatus for the commercial and sanitary disposal of sewage wherein a bed or layer of sewage sludge is maintained in a substantially quiescent state while heated aeriform fluid is projected therethrough to reduce the same to combustible dryness.

Yet another object of my invention resides in the provision of a process and apparatus for the commercial, sanitary disposal of sewage comprising forming a bed or layer of the sewage and simultaneously projecting aeriform fluid through the sewage and across the face of the sewage to reduce the same to combustible dryness.

Still another object of my invention resides in the provision of a process and apparatus for the disposal of sewage which comprises forcing heated aeriform fluid through the sewage when projected in relatively fine form whereby to reduce the same to combustible dryness.

Yet another object of my invention resides in the provision of a process and apparatus of the above character comprising projecting heated aeriform fluid through the sewage with sufficient velocity to cause the sewage to be projected in sprayed or relatively fine form while subjected to the action of heated aeriform fluid whereby to reduce the sewage to combustible dryness.

Yet another object of my invention resides in the provision of a method and apparatus for disposal of sewage comprising projecting heated air through sewage with sufficient force to cause a spray or projection of the sewage in substantially fine form while passing heated aeriform fluid and preferably heated gases of combustion through the sprayed sewage whereby to reduce the same to combustible dryness.

Yet another object of my invention resides in the provision of a process and apparatus comprising projecting heated gases of combustion through the sewage with sufficient force to cause the projection of the sewage in relatively fine form while at the same time passing heated gases of combustion through the projected sewage and into contact with the bed of the sewage to reduce it to combustible dryness.

Yet another object of my invention resides in the provision of a process and apparatus for the commercial disposition of sewage which consists in the compact arrangement of a furnace for burning fuel and/or combustibly dried sludge residue and in passing the products of combustion directly to a drier into which the sludge to be reduced is introduced and/or in utilizing the gases of combustion for drying sewage either by heating air for projection through and onto the sewage and/or by using the gases of combustion for projection onto and through the sewage, or by a combination of heated air and gases of combustion projected through and onto the sewage.

Yet another object of my invention resides in an improved process and apparatus for the sanitary and commercial disposition of substantially raw sewage by removing preliminarily a substantial proportion of the water content of the sewage either by settling and/or filtering and/or evaporation and thereafter heating the partly de-watered sludge in a manner to eliminate the odoriferous gases and to reduce the same to combustible dryness, and preferably thereafter burning the combustibly dried sludge residue and in utilizing the heat of combustion with or without added fuel for generating sufficient heat to carry out the evaporation and/or drying processes of further quantities of sewage.

Yet another object of my invention comprises the provision of an improved process and apparatus for the disposition of substantially raw sewage comprising partly de-watering the sewage by settling, activating the effluent, recovering the partly de-watered sludge, and mixing the same with the activated sludge and thereafter partly de-watering the mixed fluid sludge preferably by preliminary evaporation or filtration and thereafter heating the partly evaporated sludge to combustible dryness in a manner to eliminate the odoriferous gases, burning the same, and in utilizing the heat of combustion for drying additional quantities of sludge.

Yet another object of my invention resides in the provision of a process and apparatus for the sanitary, commercial disposition of sewage which comprises partly de-watering the sewage and thereafter heating the sewage sludge to reduce it to combustible dryness and burning the dried sludge residue whereby to dispose of the sewage.

Yet another object of my invention resides in the provision of a process and apparatus for the sanitary and commercial disposition of sewage which comprises partly de-watering the sewage, thereafter heating the sludge to reduce it to combustible dryness, and burning the sludge with additional fuel whereby to dispose of the sludge and whereby to provide sufficient heat of combustion to reduce further sewage to combustible dryness.

Yet another object of my invention resides in the process and apparatus for the sanitary and commercial dispositon of sewage comprising the preliminary evaporation by heat of substantially fluid sludge whereby to render the sludge substantially viscous to permit it to be continuously flowed in the form of a bed or layer, or to be projected in finely divided condition, and subjected to heated aeriform fluid and reduced to combustible dryness, and thereafter burned, preferably in the presence of added fuel, to generate sufficient heat of combustion to continue the heating operation for additional sewage.

Yet another object of my invention resides in the process and apparatus for the sanitary and commercial disposal of sewage which comprises burning combustibly dried sewage sludge with sufficient fuel to generate sufficient heat of combustion whereby to preliminarily partly evaporate sewage whereby to partly de-water the same and thereafter utilize the remaining heat of combustion in reducing the partly de-watered sludge to combustible dryness by means of the gases of combustion and/or by heated aeriform fluid including heated air and/or the heated gases of combustion.

Yet another object of my invention resides in the provision of a process and apparatus for carrying out the process of the foregoing paragraph wherein the gases of combustion of the burning sludge and/or fuel are utilized for preliminarily evaporating the sewage and for preliminarily heating air to be used in the stoker or furnace and/or in reducing the sludge to combustible dryness.

Yet another object of my invention resides in the provision of a process and apparatus for disposing of sewage by reducing the same to combustible dryness and burning which comprises utilizing the heat of the heating medium after said medium has so dried the sludge, for heating air to be passed to a furnace or other heating means and/or for heating air to be used in the drying operation.

Yet another object of my invention resides in the provision of a process and apparatus for the sanitary and commercial disposal of sewage sludge by heating the same to combustible dryness and burning, which includes the utilization of the heat of combustion and/or the heat from the drying operation, for carrying out certain preliminary heating operations in the general process.

Yet another object of my invention resides in the provision of a process and apparatus for drying liquid and/or fluid sludge to the combustibly dry state by introducing the same when in finely divided condition into a maintained relatively high vacuum, whereby to quickly evaporate the moisture content of the sludge.

Yet another object of invention resides in the provision of a process and apparatus for the reduction of sludge of substantially yeastcake-like consistency by finely dividing the same and projecting the sludge through a highly heated aeriform fluid whereby to reduce the sludge to combustible dryness very quickly.

Yet another object of my invention resides in the provision of a means and method for burning sludge containing less than substantially 25% moisture whereby to dispose of the sludge and to eliminate odoriferous gases.

These and other objects of my invention will be apparent from a perusal of the following specification taken in connection with the drawings, wherein Fig. 1 is a diagrammatic flow sheet showing the flow of the air, sludge, hot gases and steam to the various elements of the system;

Fig. 2 is a building arrangement and side elevation showing the various elements of the system in relation to one another, the preliminary treatment of the sludge not being shown in the figure;

Fig. 3 is a plan section view of the complete arrangement shown in Fig. 2;

Fig. 4 is a cross section taken on line 4—4 of Fig. 2;

Fig. 5 is a somewhat diagrammatic view of a more economical arrangement of an apparatus for carrying out my process;

Fig. 6 shows still another arrangement for economically carrying out the process of my invention;

Fig. 7 is a detailed plan view of one type of furnace that I may use in connection with the apparatus shown in Figs. 2, 3, and 4;

Fig. 8 is a cross section of the furnace and evaporator taken on line 8—8 of Fig. 7;

Fig. 9 is a side view of the type of drier shown in connection with the apparatus illustrated in Figs. 2, 3, and 4;

Fig. 10 is an enlarged detailed view of the drier shown in Fig. 9;

Fig. 11 is a partial plan view of the drier shown in Figs. 9 and 10;

Fig. 12 is a section on line 12—12 of Fig. 9;

Fig. 13 shows an arrangement of float control for feeding the sludge to the drier;

Fig. 14 is a perspective view showing the formation of the sludge bed when subjected to the action of the heated aeriform fluid;

Fig. 15 is a detailed perspective view of the means for deflecting the heated aeriform fluid to the underside of the drier.

My invention is applicable to the sanitary and commercial disposition of sewage having various percentages of moisture content. In certain aspects it is adaptable to the disposal of sewage containing as high as 99½% water content, i. e., raw, or substantially raw sewage. In certain other aspects the invention is applicable to the disposition of sewage sludge containing substantially as low as 70% moisture content. The process and apparatus are adaptable to the sanitary and commercial disposition of sewage in liquid, or fluid, condition.

For purposes of illustration I have disclosed one form of my invention as applicable to the treatment and the disposal of raw sewage, which contains substantially 99½% moisture content, including the manner in which the effluent from the settling chambers and sedimentation tanks used in the process, is conveyed to the activated sludge tanks and the manner in which the activated sludge is connected into my process or system for its sanitary disposal along with the partly de-watered sludge coming from the sedimentation tank. My invention is equally applicable to sewage containing less moisture content, it being obvious that the exact details of the process and apparatus which is herein shown diagrammatically is subject to many modifications and changes in accordance with the type of sludge or sewage to be treated, with local conditions, and other factors which might cause variations of the general principles of my process and apparatus.

In order to exemplify the general principles of one aspect of my invention for the treatment and/or destruction of sewage in a sanitary and commercial way, I shall now describe the complete process and apparatus for the treatment of raw sewage as is shown in the diagrammatic flow sheet of Fig. 1.

The raw sewage direct from the sewer 2 and containing substantially 99½% water is first put through a suitable screening device 4 to remove the coarse and floating material. After the sewage has passed through the coarse screens, it flows into the preliminary skimming tanks 6 where the sewage is detained for a short period. The purpose of these tanks is to remove the oil and other scum forming material and to settle the other heavier suspended matter to the bottom to be drawn off continually with about 15% of the average flow and passed to the grit chamber. These skimming tanks are provided with mechanical equipment for removing the bottom sludge and the top surface scum. From the skimming tank the top flow or effluent, which amounts to a relatively large proportion of the contained water, may be run, as illustrated at 8, to the activated sludge tank if desired. The bottom flow of the somewhat thickened sludge from the skimming tank is passed by means of pipe 10 to the grit chambers 12 where the velocity is greatly decreased and where the heavy gritty material suspended in the sludge settles to the bottom and from which place it is periodically removed. At the discharge from the grit chambers the sewage is substantially in its original condition except for the removal of coarse floating particles, heavy sand and other mineral substances, and a portion of the water. From the grit chambers the sludge flows to a sedimentation tank 14 where the sludge is detained for sufficient time so that the stuff may settle quite rapidly. The clear effluent may be piped from the top, as at 16, and conducted to the activated sludge tanks. The heavy stuff which is considerably thickened sludge, is run-off from the bottom of the sedimentation tank by means of pipe 18. This sludge thus partly de-watered, contains about 96% moisture and is in the form of a relatively thin liquid. Preferably, but optionally, the activated sludge from the activated sludge tank 22 may be piped as at 24 into the conduit that conducts the partly de-watered sludge to the remainder of the apparatus and the clear effluent flowing through pipe 26 in the activated sludge tank may be conducted to the river or any other desired point.

The various steps in the process for preparing the sewage sludge for destruction by heating and burning may be subjected to many alterations and changes. For instance, the steps shown in the flow sheet of Fig. 1 including the coarse screening, preliminary settling chamber, and grit chamber and sedimentation tank treatment may be re-arranged and altered and other process and apparatus substituted in order to provide suitable liquid conditioning features so as to prepare the sewage for the subsequent heating and burning. These variations and changes will be governed by the type of sewage used, factors of economy and local conditions.

In the arrangement shown, the partly de-watered sludge with the activated sludge added thereto, in liquid condition, may be pumped by means of pump 28 through pipe 30, through a preliminary heat exchanger 32 where the raw sewage at approximately 50 degrees Fahrenheit, assuming that temperature to be the average temperature of the sewage the year round, can be raised to about 150 to 200 degrees Fahrenheit. I prefer to use this heater because I can utilize some of the heat from another part of the process prior to its final discharge up the stack.

From the preliminary heater 32 the fluid sludge at approximately 96% moisture content is preferably passed through a sludge concentrator and evaporator. By so doing, I am enabled to utilize heat from some other part of my process and apparatus which would otherwise escape to the atmosphere, for the purpose of concentrating the sludge or preliminarily reducing its moisture content whereby the heating to be done in the main drying operation is less and whereby the substantially liquid sludge may be preliminarily conditioned or changed to a substantially viscous state for the particular type of drying operation carried out in the drying mechanism. That is to say, where I dry the sludge by forming it in a bed or layer on a foraminated or porous support and project heated aeriform fluid therethrough, the viscous sludge is in better condition to remain supported on the porous support than would be sludge having a much greater water content. In addition to the above advantages, there is another benefit derived in connection with the process, wherein heated air, as distinguished from hot gases of combustion is utilized in whole or in part as a medium for drying the sludge in the drier. In such a case, the air must be passed through some type of heat exchanger where it is heated by hot gases of combustion and I have found that it is impractical to pass hot gases having a temperature of 2500 degrees Fahrenheit or thereabouts through a heat exchanger, and therefore by passing the hot gases of combustion at such high temperature first through the preliminary evaporator for concentrating the sludge, I am enabled at the same time to reduce the temperature of these hot gases so that they can be utilized in a heat exchanger for heating the air in the manner described.

In this evaporator, from 50% to 60% or possibly more of the total moisture is removed from the sludge, bearing in mind that the sludge in the evaporator must remain in a state of fluidity in order to be circulated through the evaporator in the manner hereinafter described. In certain instances with certain types of sludge, it is possible to evaporate substantially as high as 80% of the moisture content in this preliminary evaporator and still have the sludge remain fluid in character. From the evaporator the sludge is passed to the drier in a state of fluidity. In those instances where the sludge contains substantially 96% moisture and substantially 60% of such moisture was evaporated in the concentrator, the sludge will pass to the drier with substantially 90% moisture content. Obviously the proportions of moisture will vary with the amount of evaporation and the type of sludge treated in the evaporator. From the evaporator the sludge passes by means of pipe 38 to the drier which I prefer to associate with a furnace in such a manner that the sludge, when reduced to a combustibly dry state, is passed to the furnace and with the addition of sufficient quantity of fuel, burned in the furnace. The heat of gases of combustion is then utilized in turn, in a continuous manner, for drying further quantities of the sludge.

In connection with certain aspects of my invention, in this sludge drying operation I may use any type of heated aeriform fluid including the direct utilization of the gases of combustion and also including heated air and/or both. In the present specification, the term "heated aeriform fluid" is used to express any type of heated aeriform medium for drying the sludge to combustible dryness. To make clear my references to sludge of "combustible dryness", it should be said that the use of this term implies a state of dryness wherein the combustible portion of the material will burn freely, generate a hot fire and provide enough excess heat for use in other parts of the process, or in performing operations other than the burning of the sludge itself. While this is not a fixed figure, I assume that a moisture content of 25% or less renders the sludge dry enough to burn and provide heat for other purposes as above described. It will be understood, of course, that sludge having a moisture content ranging from substantially 25% to substantially 50% can be burned without the addition of fuel thereto so as to consume and dispose of the sludge. However, in those instances where I desire to utilize the heat of combustion for drying additional quantities of sludge to combustible dryness, it is necessary to add additional fuel to the sludge. While I prefer to add this fuel in the furnace in the manner disclosed, it may be added at any desired point in the process.

Referring to Fig. 1, and describing the apparatus and process in general terms, the sludge forced through pipe 38 is fed into the hopper 40 of the drier and thence is formed in a bed or layer of viscous sludge in the drier in a continuous manner. The bed so formed preferably continuously moves while the heated air is projected continuously through pipes 42, 44, 46 and 48, through the bed whereby to reduce the sludge to combustible dryness. The heated air, after passing through the sludge, together with the evaporation products of the bed are caught in a hood 50 and conveyed by means of a pipe 52, and are thence passed through a first stage heater or heat exchanger 54 from whence the heated air emerges into pipe 56.

Simultaneously and continuously therewith the combustibly dry sludge is deposited from the drier onto a conveyor 158 and fed to a furnace 60. The dried sludge, together with sufficient fuel, either oil, coke, coal, or any other type of fuel may be utilized, is burned in the furnace whereby not only to dispose of the combustibly dried sewage in an economical, sanitary manner, and/or to generate sufficient heat of combustion for the destruction of the odoriferous gases due to the burning of the sludge, and also that the products of combustion may be utilized in carrying out the drying of continuous quantities of sludge, and/or the preliminary evaporation of a portion of the moisture content of the fluid sludge whereby the drying operation may be rendered more economical and expeditious, and the sludge be conditioned for more facile handling in the drier. Also, in some instances, so that the hot gases of combustion coming from the furnace may have at least a portion of the heat thereof removed permitting the gases to be put through a heat exchanger for heating volumes of relatively cold air utilized subsequently in the drying operation.

The hot gases of combustion created in the furnace by the burning of the fuel and combustibly dry sludge are passed through the evaporator and thence are passed through a second heater or heat exchanger 62, from whence they emerge through pipe 64, and are thence passed by a suitable fan or blower 66 by pipe 68 to the stack 70. The heat exchangers 54 and 62 are provided with suitable passages through which air may flow to the furnace and to the drier mechanism. For instance, air may be conveyed by means of pipe 72 and will pass in divergent paths to pipes 74 and 76 through the first heat exchanger where the temperature of the air will be raised sufficiently. The pipe 74 will connect with the furnace whereby heated air may be utilized in the furnace for burning the fuel and sludge. The heated air passing through pipe 76 will then pass in a series of relatively small pipes 78 through the second heat exchanger or heater 62, where the air passing therethrough will have its temperature raised substantially. If desired, each pipe 78 conducting the air may have a separate fan driven by a separately controlled electric motor, for the purpose of governing the volume and pressure of the heated air, and in addition, any suitable controlling means may be utilized for varying the temperature of the air which passes through the pipes 42 to 48, whereby to control the heat within and longitudinally of the drier. In certain instances I prefer to provide the pipes 46 and 48 carrying the heated air from the pipes 78 and which pipes 46 and 48 project the heated air into the endmost sections of the drier, with means for diluting the heated air passing therethrough with suitable and controlled quantities of cool air in order to prevent overheating of the sludge at the end of the drier. For this purpose I provide an additional air pipe 80 provided with a blower 82 and which pipe 80 connects with pipes 46 and 48 and is provided with suitable air valves 84 and 86 which may be adjusted to cause suitable dilution of the air.

During the evaporation of the fluid sludge in the evaporator 36 relatively large volumes of steam and vapor products are given off which are conveyed by means of pipes 88 through the heat exchanger 32 so that the heat from the steam may be utilized for preliminarily warming the sludge passing through the heat exchanger 32. This steam, after passing through the heat exchanger 32 is preferably conducted through the first heat exchanger 54 for the purpose of still further utilizing the heat thereof. I may join the pipe 88 with the pipe 52 through which the heated air and vapor products from the drier are being conducted and to pass the same in mixed condition through the first heat exchanger 54. The hot gases and steam discharged through pipe 56 are put through an obnoxious vapor condenser 90 and are thence forced by a fan or blower 92 through the stack 70.

Instead of combining the steam which is derived from the evaporation of the sludge in the concentrator with the steam collected from above the drier, I prefer to divert the steam from the evaporator to other purposes, such as radiation for heating the building, or any other process which may be associated with this apparatus requiring heat. It should be noted that the amount of heat recoverable from the steam arising from the drying sludge on the drier is sufficient for heating purposes desired in the preliminary heater.

Thermal aspects of process.

I shall select the process shown in Figs. 1 to 4 of the drawings as an illustration for exemplifying the thermal aspects of my invention as applied to treatment and destruction of sewage sludge as it is delivered to the preliminary heater with a moisture content of substantially 96%. Referring again to Fig. 1 of the drawings, as the sludge passes through the first heater 32, it is warmed from an average temperature of 50 degrees Fahrenheit to approximately 150 to 200 degrees Fahrenheit, and is then passed to the concentrator or evaporator which latter is subjected to the hot gases of combustion from the furnace having a temperature of approximately 2500 degrees Fahrenheit. In this evaporator, substantially from 50 to 60% of the moisture is removed from the sludge so that the dewatered sludge with approximately 90% moisture content or even lower in certain instances, is passed through the drier. Simultaneously therewith, the gases of combustion which have concentrated the sludge in the evaporator now pass to the first heat exchanger at a temperature of substantially 1500 degrees Fahrenheit, where such gases are utilized for heating the air which is to be projected through the sludge bed in the drier. The thickened sludge of approximately 90% moisture content is then fed onto the drier which forms it as a relatively thick sludge blanket of from three to six inches in thickness. As a result of the projection of the heated air through the continuously forming and moving sludge blanket, the sludge is reduced to combustible dryness and in the particular instance, the dried sludge contains from 10 to 15% of moisture. The heated air and vaporous products that are discharged from the drier and having a temperature of about 300 degrees Fahrenheit are conducted through the first heat exchanger so that the heat from these discharged gases will be ultimately recovered and preliminarily used for heating the air which not only passes through the furnace but also which passes through the second heat exchanger through which it will be remembered the hot gases of combustion from the furnace at 1500 degrees Fahrenheit are passed. In addition, the steam generated in the concentrator and evaporator by the preliminary evaporation of the sludge is conducted at a temperature substantially 212 to 250 degrees Fahrenheit through the sludge warmer to impart a preliminary rise in temperature to the sludge as hereinbefore described and may be conducted together with the hot air and vapor discharged from the drier, through the first heat exchanger as hereinbefore described. In instances where my process begins with the preliminary concentration or evaporation of sewage having a moisture content of substantially 96%, when such sludge is finally reduced to a combustibly dry state in the manner hereinbefore described, I burn this sludge in the proportion of one part by weight of sludge and two parts by weight of fuel in the furnace whereby to generate sufficient heat of combustion to carry on in a continuous manner the evaporation and drying operations hereinbefore described. In addition, the heat of combustion generated within the furnace is sufficiently hot, ordinarily, to destroy all odoriferous gases resulting from the burning of the dried sludge. It is thought preferable, however, to provide a condenser for the obnoxious gases in order to insure against the pollution of the atmosphere around the plant in the event that the apparatus is inexpertly or inefficiently handled. The proportions of fuel to be added to the combustibly dry sludge are determined by the moisture content of the sludge subjected to the drying process.

It will thus be observed that by the utilization of my process including the utilization of the heat of the products of combustion in the furnace in preliminarily evaporating the sludge and in carrying out the main sludge drying step and also in the utilization of the heat of discharge from the drier in the preliminary heating of the air which passes to the furnace and through the second heat exchanger, and the utilization of the steam discharged from the evaporator in the manner described, and the utilization of the combustibly dried sludge with added fuel for creating the hot gases of combustion I provide a most economical, commercial and sanitary apparatus and method for the destruction of sewage sludge.

Referring now to the details of construction of the various portions of the apparatus, and particularly to those forms of the apparatus used in connection with that process involved in the arrangement shown in Fig. 1, I shall first describe the furnace.

Furnace

By reference to Figs. 2, 3, 4, 7, and 8, it will be seen that I have arranged the furnace preferably at one end of the drying and burning apparatus, which is preferably arranged within a building or structure having an outside stack. The furnace, of desired construction, includes the usual movable grate 98 onto which coal, coke, or other fuel, 100, may be fed by means of the hopper 102, in turn fed by a spout 104 from the reservoir 106, in turn fed by external conveyor 108' as desired. The hot air in pipe 74 from the first heat exchanger 54 is forced by means of a blower 110 in the usual manner through the movable grates. In addition to the fuel inlet the furnace is also provided with other fuel inlets 112 disposed vertically above the fuel bed. These inlets 112 are provided with hoppers 114 which are fed by means of a conveyor 116. This conveyor transports the combustibly dried sludge which has been dried in the drier 50 and feeds it in continuous measured amount to the hoppers 114, where the combustibly dry sludge 118 is kept in agitated condition by means of a suitable agitator 120 driven by a belt 122 from a source of power. In addition, this same source of power is provided with eccentrics 124 for reciprocating feeders 126 whereby to positively feed measured amounts of the combustibly dried sludge to the feed channels 112 where the sludge will drop in a layer onto the burning fuel bed. By stratifying the dried sludge in a superimposed layer with respect to the burning coal or fuel bed, I am able to prevent the fluxing of these fuels. The burnt fuel and sludge will pass from the fuel bed into a suitable receptacle where ash can be removed.
Meanwhile the products of combustion at substantially 2500 degrees Fahrenheit more or less will pass through the furnace gas discharge 128 and across and about the vaporizing tubes of the preliminary evaporator for removing a portion of the moisture content of the sludge prior to its reaching the drier. The furnace is provided with an emergency stack 130 for diverting the products of combustion when necessary. This stack is temporarily closed by means of a gate 132 which may be opened when desired by any suitable mechanism.

*Preliminary de-watering of sludge*

In order to render my sludge drying process more economical so that the sewage can be heated more effectively and quickly in the drier, I prefer to preliminarily partly de-water the sewage prior to passing it to the drier. The de-watering operation can be carried out in any desired manner and with any desired apparatus. In the present instance I have disclosed this preliminary, partial de-watering of the sewage to be carried out by means of partial evaporation by the application of heat for the purpose of reducing the moisture content of the sludge. However, it is to be understood that any desired type of de-watering may be used including centrifuging of those devices shown in my pending application. Accordingly I pass the liquid or fluid sludge preferably first through the preliminary evaporator before passing it to the drier mechanism. The preliminary evaporator is adapted to remove from substantially 50 to 80% of the moisture from the fluid sludge.
In those instances where the main drying of the sludge is accomplished by the drying process and apparatus shown in Figs. 1 to 4 of the drawings, i. e., where it is desirable to have the sludge maintained in a substantially fluid condition while heated aeriform fluid is projected therethrough, it is necessary that the sludge from which substantially 80% of the moisture has been removed, be of such character that when so partly de-watered, it is still substantially fluid. However, it is to be understood that my process and apparatus is not so limited and that my invention includes the drying of any type of sludge which has been partly de-watered, whether it be either in fluid or non-fluid condition.
In addition to reducing the moisture content of the sludge, this preliminary sludge evaporation step is utilized in instances where I desire to heat air by means of the products of combustion, for accomplishing the drying of the sludge, and in such instances, by passing the hot gases from the furnace which are substantially around 2500 degrees Fahrenheit, first through the evaporator, a considerable portion of the heat of the gases is extracted in evaporating the fluid sludge, and the gases of combustion with their temperature thus lowered, may then be utilized for passing through a suitable heated chamber or passing into contact with any type of metallic surface without injuring or damaging the same. As a specific instance, the hot gases at substantially 2500 degrees Fahrenheit on passing through the evaporator will evaporate a portion of the moisture from the sludge, and in doing so they will leave the evaporator at substantially 1500 degrees Fahrenheit.
In this condition they are sufficiently low in temperature to be passed through the heat exchanger 62 for heating the air on its way to the drier. The gases on passing through the heated chamber will be discharged therefrom at substantially 400 degrees Fahrenheit and will be passed up the stack at a comparatively harmless temperature.

In the form illustrated in Figs. 7 and 8 of the drawings I have selected a well-known type of long tube evaporator and have arranged the sludge heating tubes thereof directly in the path of travel of the products of combustion as they come from the furnace. This particular type of evaporator which is of well-known construction embodies a lower header 134 which connects with a sludge pipe 34. This header 134 communicates with a plurality of relatively long tubes 136 which in turn discharge into a second header 138 wherein are located a plurality of semi-circular deflectors 140 which deflect the sludge outwardly so that it will fall down into the channel 142 provided by the upstanding flange 144. The formation of steam bubbles in the bottom ends of the long tube 136 causes a violent upheaval of the combined water and steam, like a geyser, which shoots the sludge upwardly through the tubes and causes the sludge to impinge on the curved baffles within the upper drum, whereby the sludge is deflected downwardly in the manner shown, and whereby the steam can escape laterally and upwardly. The sludge is pumped from the channel 142 through the pipe 38. The steam and vapors from the evaporated moisture of the sludge passes out through the pipe 88. Any number of these evaporators may be connected in a battery. In the present instance I have shown three. It is obvious that I may use the two stage evaporator, in which case the sludge passes serially through both of the stages and the steam for the first stage is passed into the second stage as the heating medium. This type of device will evaporate substantially 80% of the moisture.

*The drier*

The form of drying mechanism illustrated in detail in Figs. 9, 10, 11, 12, and 13, is substantially like that shown in my prior pending application hereinbefore referred to. In general, it comprises means for forming a blanket or layer or bed of fluid sludge preferably about four inches in thickness, but which thickness may be varied as desired, and preferably means for moving the bed of sludge while at the same time projecting heated aeriform fluid into contact therewith and preferably therethrough. The bed is preferably moved continuously, although it may be moved intermittently, and I prefer to project the heated aeriform fluid upwardly through the bed and with sufficient force to cause the fluid sludge to bubble and spout whereby the fluid sludge is projected or sprayed somewhat so that the globules and relatively fine spray may be more quickly brought into contact with the heated aeriform fluid and the drying effect hastened. Except for the turbulent condition of the sludge bed at that portion thereof where the bed first receives the force of the heated aeriform fluid therethrough, the sludge bed is otherwise maintained relatively quiescent, that is, it is not disturbed by raking, working or by any other mechanical means. By referring to Fig. 14 which represents, in a general way, the manner in which a bed of fluid sludge is transformed progressively from the fluid or even viscous state to complete dryness by the projected heated aeriform fluid therethrough, it will be noted that when the previously prepared sludge containing a moisture content so that the sludge is still fluid, is fed onto the drier in the form of a blanket or bed, it is still sufficiently liquid so that it will spread out into a layer of substantially uniform thickness by virtue of its own fluidity and will permit freely the upward passage of air bubbles. As the heated aeriform fluid is projected therethrough with sufficient force, the appearance of the surface of the sludge as it is first subjected to the aeration treatment is one of violent ebullition, as shown at 146, with steam bubbles emerging and breaking at the surface of the liquid just the same as on the surface of a pan of water. These geysers or sprays of fluid sludge including globules of sludge will be projected at times some distance from the bed of the sludge. As the drying proceeds, the character of the sludge changes to more and more viscous condition until toward the end of the period of fluidity, the sludge takes on the appearance of cornmeal mush in its later stages. The bubbles of air and/or gas burst and leave voids, spaces or holes in the sludge bed, which close up with more or less slowness, depending upon the viscosity of the fluid, until finally the viscosity reaches such a stage that these holes or voids caused by the passage of the heated aeriform fluid therethrough do not close but remain open and thereby form permanent channels or spaces through the then solidified sludge. As the heated aeriform fluid is continuously projected through the drying bed of sludge, these permanently formed holes permit large quantities of heated aeriform fluid to pass through the layer of drying sludge in such a manner as to readily facilitate the carrying off of the moisture and the reduction of the sludge to combustible dryness, i. e., to a reduction of the moisture content to less than substantially 25%. The manner of progressively drying the sludge including the automatic formation of air holes through which the heated aeriform fluid may be projected eliminates the necessity of providing some mechanical means for puncturing, breaking up or rendering the sludge bed porous to permit the heated aeriform fluid to pass therethrough.

As long as there is moisture to be evaporated, and as long as the heated aeriform fluid actually passes through the fluid sludge, there will be a very rapid interchange of heat from the heated aeriform fluid to the fluid sludge, causing actual steaming or vaporization of the moisture and loading the air or gases medium itself with as much moisture as that heated aeriform medium at such temperature can carry. As the drying process proceeds, however, and the aforementioned holes in the sludge bed become permanent, considerable quantities of air can pass through these holes without direct contact with the moist material and due to the lack of fluidity at this stage in the process, it is possible to dry one portion of the stiff mud-like sludge while the other portions thereof are still actually wet. Under these conditions it is possible to actually dry and ignite the edges of a piece of sludge, or those portions at the periphery of the above mentioned holes while still retaining wet portions between the holes. Inasmuch as it is not desirable to have the sludge partly burnt or charred at this state of the process I have found it desirable to provide means for lowering the temperature of the heated aeriform fluid toward the end of the drying process to such a degree as to prevent the overheating of portions of the sludge, and also, owing to the reduction in the resistance to the passage of air, by the porosity above described, I find it also desirable to reduce the pressure of the heated aeriform fluid at this portion of the drier.

Referring now to the mechanical details of the drier construction for carrying out one process for drying the sludge, the drier comprises two sprockets 148 around which passes the endless link chain 150 of any desirable construction, and which links at their pivotal interconnections carry rollers 152 adapted to roll along a horizontal guide-way 154 whereby to keep the supporting bed of the sludge in level and in uniform condition. In addition, each of the links between its pivotal connection carries a cross bar 156 which is supported from an upstanding arm 158 carried by the link, and in turn, each cross bar carries a series of spaced-apart sludge supporting elements, preferably in the form of longitudinally extending relatively narrow bars 160, which are supported on the bars 156 preferably at their central portions. Each of these bars extends on opposite sides of its centrally arranged supporting bar 156 a distance substantially equal to the central portion of the next supporting bar 156, there being a space left between the ends of two adjacent bars so as to permit the bars to turn about the end sprockets in the manner shown in Fig. 10. By arranging the bars in staggered overlapping relation in the manner shown in Fig. 11, the bars provide a sludge-supporting surface formed with a multitude of very small openings or spaces therebetween. For one type of sludge, in the present instance, these openings or spaces between the bars are preferably substantially 1/40th of an inch in width. The bars in cross section shown in Fig. 12 taper in a downward direction so as to provide sufficient clearance for any sludge that may pass therethrough whereby to prevent clogging. The construction of these bars is disclosed and claimed in my prior mentioned application, and it is understood that these bars extend across the entire width of the carrier between the links so as to provide a bed of considerable width. Only a part of the bed is shown.

The under surface of the upper portion of the drier and over which the sludge supporting mechanism passes, is divided into a number of chambers, preferably four, which are separated by partitions 162 arranged so as to preserve contact with the lower edge of the uprights 158 which support the cross-bars 156. These partitions 162 are provided with suitable interior facings of insulation 164, and are also provided with longitudinally extending sheet metal wall members 166 having outwardly extending looped portions 168 which resiliently press against the inner faces of the supports for the cross bars 156 so that as these cross bars pass over the stationary partition 162, a resilient wiping effect between the resilient fingers 168 and the traveling support for the cross members 156 will prevent the escape of the heated aeriform fluid at the junction of the traveling sludge-supporting bed and the stationary chamber forming member. In addition, each cross bar 156 and its support is provided with an upstanding partition member 170 preferably of sheet metal. These partitions are provided with outwardly extending tips 172 adapted resiliently to overly the adjacent ends 174 of similar partitions carried by the next adjacent cross bar 156 so that when the cross bars and their sludge carrying platforms are passing along the horizontal frame of the drier, that is when the endless belt carrying the members 160 is passing along during the drying period, these upstanding plates 170 will form a closed side for the drier above the drying bed. In addition, the upper ends of these plates 170 will resiliently contact with a spring metal finger 176 carried by the depending edge of the hood 50 which overlies the drying chamber. The arrangement of the side wall members 170 in overlapping relation as shown in Fig. 11 permits these plates 170 to separate when they pass around the sprocket 148. As an additional means for closing in and sealing each one of the chambers or compartments into which the heated aeriform fluid is projected, I provide each one of the cross supports 156 on its under side with a closure of preferably resilient sheet metal which has one end affixed in any suitable manner to the depending portions 178 of the cross bar 156. This sheet metal sealing member extends under and rearwardly of the bar 156 and is adapted to wipe over a guiding member 180 mounted on the top of the cross wall of each partition 164 and 162. By means of the resiliency of the trailing edge 182 and its wiping action along the upper surface of the member 180 the sealing effect of each compartment is assured. It will be understood, of course, that these sealing members 182 extend entirely across the width of the chambers 164 and thus prevent aeriform fluid, which is forced into each chamber, from passing into the other chamber. In addition to the aforementioned details, the hood 50 opposite each chamber is provided with an observation window 184 for the purpose of watching the progress of the sludge drying operation at the various compartments forming the different stages of drying.

It will be understood in the preferred embodiment the endless belt and the sludge supporting member are moved in a continuous manner by an appropriate means. And in order continuously to form a bed, blanket or layer of fluid sludge of substantially uniform thickness in an automatic manner on the upper surfaces of the bed supporting members 160, any suitable means may be utilized. In the present instance I have shown one embodiment of a suitable means comprising a box-like device 186 extending the width of the drier surface with its discharge end located between the side partitions 170 and disposed over the receiving end of the sludge supporting elements 160 and in a position so that as these members are formed in closed relation and moved forwardly the fluid sludge will flow through the discharge gate 188 over a flexible distributing tongue 190 preferably of heat-resisting material whereby the sludge will be formed in a layer of desired thickness. In the present instance, a bed of sludge of uniform thickness approaching from two to six inches in depth may be provided. Means is provided for controlling the flow of the sludge into the chamber 186. In the present instance, this comprises a float 192 operated by the level of the fluid sludge in the box 186 and adapted to operate a valve 194 in a pipe 196 through which the sludge flows from the pipe 38 coming from the evaporator as hereinbefore described.

It will be understood, of course, that the sludge supporting bars providing a porous or foraminated surface through which heated aeriform fluid is adapted to be forced may be constructed in any desirable manner in accordance with the teachings of my hereinbefore described pending application.

Means is provided for supplying the chambers formed in the partitions 164 with heated aeriform fluid for projection through the sludge bed. One manner of accomplishing this is shown at Fig. 15 of the drawings wherein the details of construction of one of the manifolds 198 is shown. Each one of these manifolds is provided with an inlet bus pipe 200 through which heated aeriform fluid is adapted to be forced. The interior portion of each manifold is provided with a plurality of deflecting members 202 arranged to distribute the heated aeriform fluid and to deflect it upwardly through the interstices between the sludge supporting bars.

Referring now to Figs. 2, 3, and 4 of the drawings wherein is disclosed the apparatus the details of which form the subject matter of Figs. 7, 8, 9, 10, 11, 12, 13 to 15 of the drawings, and wherein the various air pipes interconnecting therewith as shown in the flow sheet of Fig. 1, it will be appreciated that in the compact arrangement of the various features forming my apparatus or system, the relatively large structure 204 is adapted to house or enclose these various features and that the arrangement is such that the stack 70 is preferably disposed outside of the housing. With reference to Figs. 2, 3, and 4, it will be seen that the furnace 60 shown at the left of the figure and provided with emergency stack 130 receives its fuel from the hopper 102 and its combustibly dry sludge from the hopper 114 and that the gases of combustion from the furnace pass in the manner indicated by the arrow 206 across the preliminary evaporator 36 from whence they pass directly through the heat exchanger 108 to the blower 126 thence through the pipe 68 to the stack 70. At the same time atmospheric air is drawn in through pipe 72 and is passed through heat exchanger 54, thence through pipe 76, blower 78, thence through pipes 42 to 48 into the four separate chambers of the drier from which point the heated air is projected through the sludge bed. At the same time the heated aeriform fluid which includes the heated air and vapor products are captured by the hood 50 and passed through pipe 52 from which point these gases are carried over and passed through the first heat exchanger 54. Simultaneously therewith the steam and water vapors from the evaporator 36 are passed through steam pipe 88 through the sludge warmer 32 and thence are injected by means of the pipe 88 into the pipe 52 through which the hot air is passed to the first heat exchanger 54. The hot air and water vapor is discharged from the heat exchanger 54 through the pipe 56 through the obnoxious vapor condenser 90 and thence is passed by means of a suitable blower up the stack.

The fluid sludge is pumped by means of pipe 30 through the preliminary sludge warmer 32 and is then piped by means of pipe 34 to the bottom portion of the vaporizer 36 from which point the sludge is then piped by means of pipe 38 to the float control box 186 at the receiving or front end of the drier. After the sludge is dried, it is discharged from the end of the traveling drier into screw conveyor 58 from which point it is fed into the hopper 114 which feeds into the furnace.

In certain instances quicker drying and more economical operation can be carried out by simultaneously projecting heated aeriform fluid through the sludge bed while also passing heated aeriform fluid over and across the face of the sludge bed. In this type of process and apparatus, the force of the heated aeriform fluid which is projected through the sludge bed, as before described, will project the substantially fluid sludge upwardly in a spray or finely divided condition for a sufficient height so that heated aeriform fluid can at the same time be passed through and across this projected sludge and across the face of the bed for the purpose of more quickly drying the sludge. In this type of apparatus the heated aeriform fluid may consist of air and/or hot gases of combustion or the hot gases themselves may be utilized directly.

In Fig. 5 of the drawings I have shown an apparatus for carrying out just such a process. In this figure the furnace 60 with its emergency stack 130 is arranged to burn the combustibly dried sludge fed into the hopper 114 and the furnace gases, i. e., the hot gases of combustion, are then passed from the furnace directly into contact with the sludge concentrator and preheater 36 just as in the process and apparatus as shown in Fig. 2. After passing through the sludge concentrator, the hot gases of combustion pass through a relatively long tunnel-like conduit which is arranged immediately above the drier of the form shown in Fig. 2. In Fig. 5 the drier is provided with the usual compartments and provided with means for projecting heated air through the compartments as in the manner described in Fig. 2, however, in Fig. 5 the roof of the drier comprises preferably a metallic plate 208, preferably ribbed heavily on its inside and designed to absorb the heat of the gases and transfer said heat to the air passing through the conduit 210 formed between the plate 208 and the insulated casing member 212 forming a part of the heat exchanger. This heat exchanger is disposed above the drier and is arranged so that air going through pipe 214 is passed through the heat exchanger and into conduit 210 while at the same time the heated gases of combustion will pass through the heat exhanger in a manner well known in the art and isolated from the incoming air so as to cause a heating of the air to a relatively high temperature in the manner somewhat after that shown in the apparatus of Fig. 2. In the construction shown in Fig. 5 the hot products of combustion after passing through the heat exchanger are passed through an obnoxious vapor condenser 216 and then conducted through conduit 218 by a blower 220 to the stack 222. A suitable liquid condenser 224 is inserted in the line for carrying off condensed water and other liquid. The heated air passing through the conduit 210 above the drier is extracted by means of suitable blowers 226 through the ports 228 and forced into the four separate chambers of the drier from which point the heated air is projected through the sludge bed in the manner described in connection with Fig. 2 of the drawings. The heated air being forced up through the sludge bed at high velocities causes the fluid sludge on the drier violently to boil and to throw a spray up into the air a sufficient height so that the products of combustion going through the tunnel-like conduit immediately above the sludge bed will pass among the globules or spray of sludge and cause the same to be rapidly dried in a very simple manner. In Fig. 5 of the drawings, the course of flow of the products of combustion is indicated by the heavy dash and dot line and the course of flow of the air which is heated and projected through the sludge bed is indicated by the dotted line with appropriate arrow. It will be noted that the heated air passing through the sludge bed together with the vapor products resulting from the drying of the sludge bed will join the hot products of combustion and will be conveyed therewith through the obnoxious vapor condenser before being discharged through the stack.

In the construction illustrated somewhat diagrammatically in Fig. 6, instead of using heated air for projection through the sludge bed, I utilize directly the gases of combustion forcing them not only through the sludge bed in a manner hereinbefore described, but I simultaneously therewith project these hot gases of combustion through the ebullient sludge bed and there across while at the same time extracting sufficient amounts of these gases of combustion and pass them through a separator for removing ash and other undesirable foreign matter in the gases of combustion and thence return these hot gases directly through the bed of sludge. In this figure likewise the path of flow of the hot gases of combustion is indicated as taking the course from the furnace 60 through the sludge concentrator 36 thence through a substantially tunnel-like conduit 230 formed by an insulating roof over the drier. These products of combustion are ultimately passed through a large pipe 232 through an obnoxious vapor condenser 234 through a liquid condenser 236, blower 238 and stack 240. At suitable stages along the length of the tunnel-like conduit I provide pipes 242, 244, 246 and 248 from which a portion of the gases of combustion are drawn and pass through separators 250, thence through fans 252, pipes 254 from which point the products of combustion are forced in the manner hereinbefore described through the drier compartment and then through the porous sludge supporting bed and thence through the sludge from which point the escaping gases of combustion and water vapor join with the products of combustion and are passed through the pipe 232 to the stack as hereinbefore described. In Figs. 5 and 6 the course of the fluid sludge is indicated as passing from pipe 256 through the preliminary sludge warmer 258, thence to the bottom part of the sludge concentrator and evaporator 260, thence into a sludge reservoir 262 from which point the sludge may be by-passed back through the concentrator or is passed into the float-controlled sludge feed box 264 for automatic feeding onto the continuous drier.

With respect to that part of my invention wherein I propose to dry sludge by subjecting it in a relatively finely divided condition to the action of heated aeriform fluid, I may accomplish this in a number of ways, depending upon the type of sludge to be handled. In certain instances where liquid or fluid sludge is to be dried, I may project the liquid sludge in spray form in a manner to let it fall by gravity for some distance through highly heated aeriform fluid such as heated air, heated combustible gases, or both, so that at the termination of the fall of the sprayed sludge, it will be combustibly dry. In certain other instances, I prefer to inject by spraying under pressure, or to centrifuge the fluid sludge either in liquid or substantially fluid condition and preferably when heated, into and through a highly rarefied atmosphere such as a vacuum chamber, maintained under a vacuum of 28 or 29 inches of mercury. In this instance the liquid sludge when thus sprayed or injected in finely divided condition and particularly when heated to any desirable range of temperature will immediately be dehydrated due to action of the vacuum on the moisture content of the sludge, so that the sludge will fall to the bottom of the chamber in a combustibly dry condition where it may be extracted and burned to provide sufficient heat for preliminarily heating the liquid or fluid sludge prior to its injection into the vacuum chamber.

In certain instances I propose to add to the fluid sludge a sufficient quantity of material for the purpose of assisting in the drying operation of the substantially fluid sludge in the drier, i. e., by rendering the fluid sludge more porous, less pasty, or non-cohesive. This material may be added to the sewage in the sedimentation tank 14. The ingredient added need not necessarily be combustible, and/or I also propose to add a combustible, or heat-contributing ingredient to the fluid sludge, such, for instance, as a fuel so that after the sludge has been dried, and during its subsequent burning in the furnace, this added fuel ingredient together with the combustible sludge will provide sufficient heat for utilization in drying additional quantities of sludge. In this last instance, the fuel which is to be added to the fluid sludge can be in any desired form such as fine coke, bituminous coal, wood shavings, or sawdust, or dried vegetable matter of any form.

Having thus described my invention, what I desire to secure by Letters Patent is as follows:

1. The herein-described process of reducing liquid sewage containing approximately 96% water to combustible dryness for its sanitary disposition by burning, comprising evaporating substantially from 50 to 80% of the moisture content of sewage to provide a partly de-watered fluid sludge; forming a layer of such substantially fluid sludge, and projecting heated gas through said sludge layer to reduce the same to combustible dryness, burning the dried sludge, and utilizing the heat of the products of combustion for drying additional quantities of the sewage.

2. The process of disposing of sewage comprising preliminarily removing a portion of the water, the grit and coarse foreign matter from the raw liquid sewage, settling and recovering the sludge from the sewage, preliminarily evaporating a substantial portion of the moisture of the fluid sludge, and thereafter heating the sludge to combustible dryness, burning the dried sludge with added fuel and utilizing the heat of the products of combustion in the drying and evaporation operations of further sludge.

3. An apparatus of the character described, the combination of a furnace, an evaporator, an air heater and a sludge drier, means for passing the products of combustion from said furnace to said evaporator and then through said heater, and means for passing air through said heater to heat the air and for passing the heated air through the sludge drier to dry the sludge in said drier.

4. A device of the class described, the combination of a furnace, an evaporator, a heat exchanger, and a sludge drier, means for passing the products of combustion from said furnace to the evaporator, means for passing fluid sludge through the heat exchanger, through the evaporator and into the drier, means for reducing the sludge to combustible dryness within the drier, and means for passing the steam discharged from the evaporator through the heat exchanger.

5. In a device of the class described, the combination of a furnace, a first heat exchanger, a second heat exchanger and a drier, means for passing the gases of combustion from said furnace to said second heat exchanger, means for passing aeriform fluid to said first heat exchanger, then to said second heat exchanger and for projecting said heated air into the drier and into contact with the sludge therein to reduce the same to combustible dryness, and means for conveying the heated aeriform fluid discharged from said drier to said first heat exchanger to heat the air passing therethrough.

6. An apparatus of the character described comprising a furnace, a sludge drier, a preliminary heater for the fluid sludge, an evaporator for the fluid sludge, means for projecting aeriform fluid through the sludge in the drier to reduce the same to combustible dryness, means for utilizing the heat of the products of combustion of the furnace for evaporating sludge in the evaporator and for thereafter heating the aeriform fluid, means for utilizing the steam in the evaporator for heating the preliminary sludge heater, and means for utilizing the discharged aeriform fluid from the drier for preliminarily heating the aeriform fluid.

7. An apparatus of the character described comprising a furnace, an evaporator, a heater, and an obnoxious vapor condenser and a sludge drier, means for passing sewage sludge through the evaporator and thence to the drier, means for heating the sludge in the drier to combustible dryness including connections for delivering heated gases from the heater to the drier, means for discharging the steam and vapor products from the drier through the heater in order to heat the gases delivered thence to the drier and means for discharging the steam and vapor from the heater through the obnoxious vapor condenser, and means to deliver sludge from the drier to the furnace for ultimate sanitary destruction by burning.

8. In a device of the class described, the combination of a furnace having a relatively long extension containing an evaporator and a longitudinally extending drier, means for supporting a bed of sludge on said drier, a heat exchanger having a wall forming a part of said extension, means for passing hot gases of combustion from the furnace through the evaporator and the longitudinal extension and into contact with the wall of the heat exchanger, means for passing the products of combustion from the drier through the heat exchanger, means for passing air through the heat exchanger and into contact with said wall and for passing the air thence through the sludge bed supported on the drier.

JOSEPH HARRINGTON.